(12) United States Patent
Cho

(10) Patent No.: US 7,974,000 B2
(45) Date of Patent: Jul. 5, 2011

(54) OPTICAL SHUTTER HAVING CHARGED PARTICLE AND DISPLAY APPARATUS USING THE SAME

(75) Inventor: Sung Nae Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 12/510,412

(22) Filed: Jul. 28, 2009

(65) Prior Publication Data

US 2010/0103500 A1 Apr. 29, 2010

(30) Foreign Application Priority Data

Oct. 27, 2008 (KR) .................. 10-2008-0105475

(51) Int. Cl.
*G02B 26/00* (2006.01)
(52) U.S. Cl. ........................................ 359/296; 359/290
(58) Field of Classification Search .................. 359/290, 359/296, 665; 345/107, 108; 252/585; 430/37, 430/38, 19, 60, 107, 108
See application file for complete search history.

(56) References Cited

U.S. PATENT DOCUMENTS

| | | | | |
|---|---|---|---|---|
| 6,241,921 | B1 * | 6/2001 | Jacobson et al. | 264/1.36 |
| 6,529,312 | B1 * | 3/2003 | Saxe | 359/296 |
| 6,650,462 | B2 * | 11/2003 | Katase | 359/296 |
| 7,023,609 | B2 | 4/2006 | Mizuno | 359/296 |
| 2006/0066802 | A1 * | 3/2006 | Kitayama | 349/156 |
| 2006/0087490 | A1 | 4/2006 | Ding et al. | |
| 2007/0109622 | A1 | 5/2007 | Matsuda | |

FOREIGN PATENT DOCUMENTS

| | | |
|---|---|---|
| JP | 2006-64943 A | 3/2006 |
| JP | 2007-140366 A | 6/2007 |
| KR | 10-2001-0072703 A | 7/2001 |

* cited by examiner

*Primary Examiner* — Mohammed Hasan
(74) *Attorney, Agent, or Firm* — Sughrue Mion, PLLC

(57) ABSTRACT

Provided are an optical shutter including charged particles, and a display apparatus using the optical shutter. The optical shutter may block or transmit light by changing the position of the charged particle according to a direction an electrical field is applied. Also, a new type of display apparatus may be realized by using the optical shutter as a pixel of the display apparatus. The charged particles react very quickly to the change of the electrical field, and thus, a display apparatus having high operational speed may be realized.

18 Claims, 11 Drawing Sheets

US 7,974,000 B2

OPTICAL SHUTTER HAVING CHARGED PARTICLE AND DISPLAY APPARATUS USING THE SAME

CROSS-REFERENCE TO RELATED APPLICATIONS

This application claims the benefit of Korean Patent Application No. 10-2008-0105475, filed on Oct. 27, 2008 in the Korean Intellectual Property Office, the disclosure of which is incorporated herein in its entirety by reference.

BACKGROUND

1. Field

One or more exemplary embodiments of the present invention relate to an optical shutter having a charged particle and a display apparatus using the optical shutter.

2. Description of the Related Art

Currently, liquid crystal display apparatuses and plasma display apparatuses are being used as flat type display apparatus. Also, an organic light emitting diode (OLED) is being researched as a next-generation flat display apparatus. The plasma display apparatuses and the OLED are self-emissive light emitting devices which do not need a light source; however the light crystal display apparatuses are not self-emissive light emitting devices which use a light source such as a backlight unit. Also, display apparatuses such as the liquid crystal display apparatuses, which are not self-emissive devices, use an optical shutter that transmits/blocks light emitted from a separate light source. The optical shutter which is arranged in each pixel of a display apparatus individually transmits/blocks light to form a whole screen image. For example, the optical shutter used in the liquid crystal display apparatuses includes two polarization plates and a liquid crystal layer disposed between the two polarization plates. The polarization plates transmit light having certain polarization elements only and absorb light having other polarization elements. In regard to liquid crystal display apparatuses of the related art, research is being conducted on the reduction of light loss due to the polarization plates. Also, research is being actively conducted to increase the narrow viewing angle caused due to the use of a liquid crystal layer.

SUMMARY

One or more embodiments include an optical shutter that uses a charged particle instead of a liquid crystal layer and a polarization plate.

Also, one or more embodiments include a display apparatus using the optical shutter that uses a charged particle.

Additional aspects will be set forth in part in the description which follows and, in part, will be apparent from the description, or may be learned by practice of the present exemplary embodiments.

To achieve the above and/or other aspects, one or more embodiments may include an optical shutter including: first and second transparent electrodes disposed to face each other; a reflection wall that surrounds a space between the first and second transparent electrodes so that a closed inner space is formed, and reflects light; and at least one charged particle arranged in the closed inner space.

The optical shutter may further include a transparent insulation layer formed over inner surfaces of the first and second transparent electrodes and inner surfaces of the reflection wall.

One charged particle may be arranged in the closed inner space, and a first concave groove may be formed in the transparent insulation layer on the first transparent electrode so that the charge particle may land at the first concave groove, and a second concave groove may be formed on the transparent insulation layer on the second transparent electrode so that the charge particle may land at the second concave groove.

The first concave groove may be narrower than the second concave groove.

The optical shutter may further include a reflection plate that reflects light, and is disposed below or above the first transparent electrode, wherein an opening is formed in a center portion of the reflection plate so that light may transmit through the reflection plate.

A diameter of the charged particle may be smaller than a diameter of the inner space and larger than a diameter of the opening.

The reflection wall may have electrical conductivity, and the optical shutter may further include a first resistance layer disposed between the reflection wall and the first transparent electrode and a second resistance layer disposed between the reflection wall and the second transparent electrode.

Instead, the reflection wall may be formed of a dielectric mirror.

A plurality of charged particles which are charged with an equal polarity may be dispersed in the closed inner space.

A dielectric coating may be formed on a surface of the charged particles.

A plurality of fine through-holes may be formed in a portion of the transparent insulation layer formed on the first or second transparent electrode.

The optical shutter may further include a quantum-dot color filter disposed on the second transparent electrode and a ultraviolet (UV) absorption layer disposed on the quantum-dot color filter.

The optical shutter may further include a color filter disposed on an upper surface of the second transparent electrode.

The charged particles may include at least two types of particles having different color absorption characteristics.

The charged particles may include particles having wavelength selective reflection characteristics.

Also, a display apparatus according to one or more embodiments may include the above-described optical shutter.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
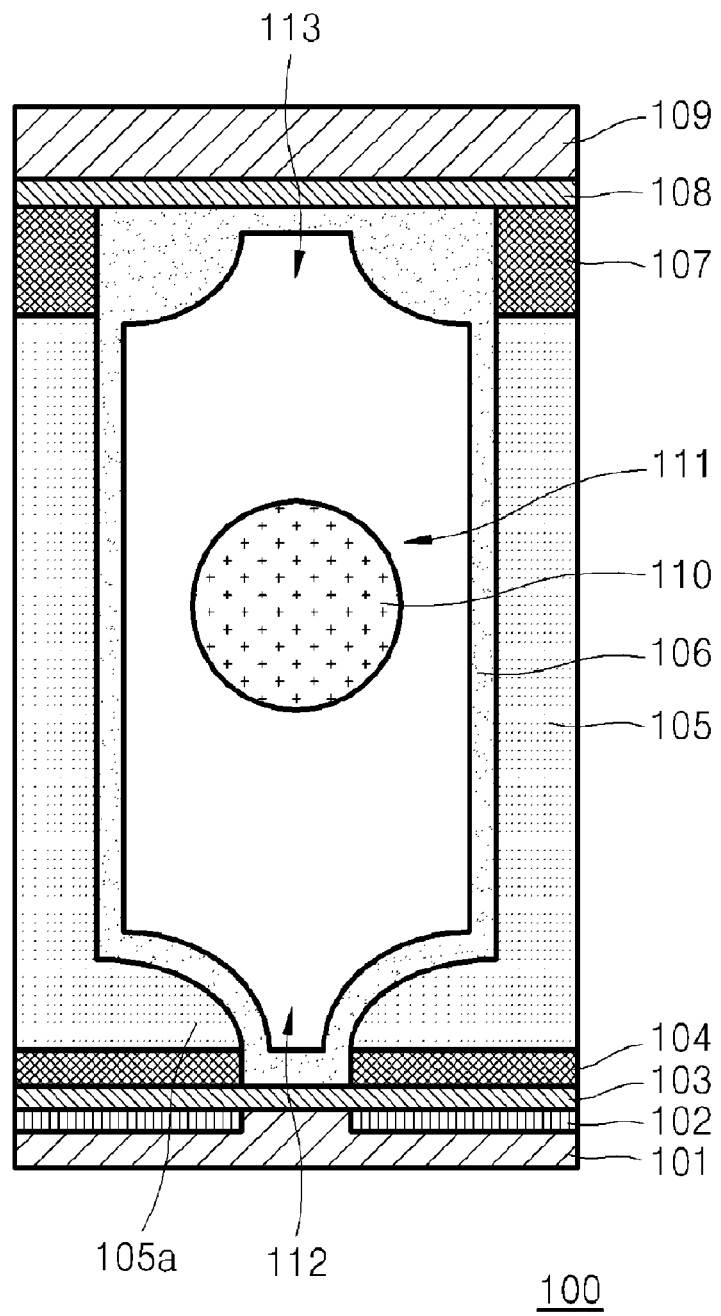
FIG. 1 is a cross-sectional view illustrating the structure of an optical shutter according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

FIG. 1 is a cross-sectional view illustrating the structure of an optical shutter 100 according to an exemplary embodiment. Referring to FIG. 1, the optical shutter 100 includes a lower transparent substrate 101, a reflection plate 102, a lower transparent electrode 103, a lower resistance layer 104, a reflection wall 105, a transparent insulation layer 106, an upper resistance layer 107, an upper transparent electrode 108, an upper transparent substrate 109, and a spherical charged particle 110. The reflection wall 105 is formed to surround a space between the lower transparent electrode 103 and the upper transparent electrode 108, thereby forming a closed inner space 111. As illustrated in FIG. 1, one charged particle 110 is disposed in the closed inner space 111 which is surrounded by the lower and upper transparent substrates 101 and 109 and the reflection wall 105. Although it is shown in FIG. 1 that the charged particle 110 is charged with a (+) polarity, the charged particle 110 may also be charged with a (−) polarity according to exemplary embodiments.

Hereinafter, a case in which light emitted from an external light source is incident to a lower portion of the optical shutter 100 and emitted through an upper portion of the optical shutter 100 will be described as an example for convenience. In the lower portion of the optical shutter 100, the reflection plate 102, the lower transparent electrode 103, and the lower resistance layer 104 are sequentially disposed on the lower transparent substrate 101 in the stated order. In FIG. 1, the reflection plate 102 is formed between the lower transparent substrate 101 and the lower transparent electrode 103, but alternatively, the reflection plate 102 may be formed between the lower transparent electrode 103 and the lower resistance layer 104. In the lower portion of the optical shutter 100 according to the current exemplary embodiment, a narrow path, through which incident light emitted from an external light source (not shown) such as a backlight unit may travel, is formed using the reflection plate 102 and the lower resistance layer 104. That is, a small opening, through which incident light may pass, is formed in a center portion of the reflection plate 102 disposed on the lower transparent substrate 101 and in a center portion of the lower resistance layer 104 disposed on the lower transparent electrode 103. In addition, a lower portion of the reflection wall 105, which is in a lower portion of the closed inner space 111, is formed as a protrusion 105a on the entire upper surface of the lower resistance layer 104. Accordingly, light emitted from an external light source may be incident to the closed inner space 111 of the optical shutter 100 through a defined path that is formed by the reflection plate 102, the lower resistance layer 104, and the lower portion of the reflection wall 105.

Also, in the upper portion of the optical shutter 100, the upper resistance layer 107 is formed on the reflection wall 105, and the upper transparent electrode 108 and the upper transparent substrate 109 are sequentially disposed on the upper resistance layer 107 in the stated order. As illustrated in FIG. 1, a broader optical transmit path is formed in the upper portion of the optical shutter 100 than in the lower portion of the optical shutter 100. That is, a protrusion, like the protrusion 105a formed on the lower portion of the reflection wall 105, is not formed in the upper portion of the reflection wall 105. Also, the upper resistance layer 107 has the same thickness as the reflection wall 105. Accordingly, light incident to the closed inner space 111 of the optical shutter 100 may not be emitted to the outside of the optical shutter 100 through the relatively broad optical transmit path formed in the upper portion of the optical shutter 100.

The transparent insulation layer 106 is formed on the entire inner walls of the optical shutter 100. That is, the transparent insulation layer 106 is formed on a portion of an upper surface of the lower transparent electrode 103 exposed through the opening of the lower resistance layer 104, on inner walls of the reflection wall 105 and the upper resistance layer 107, and on a portion of a lower surface of the upper transparent electrode 108. The transparent insulation layer 106 protects the charged particle 110 inside the closed inner space 111 of the optical shutter 100 so that the charged particle 110 maintains an electrically charged state. A lower concave groove 112 and an upper concave groove 113 which are both funnel-shaped are respectively formed in lower and upper portions of the transparent insulation layer 106 so that the charged particle 110 may land at the lower concave groove 112 and the upper concave groove 113. That is, the lower concave groove 112 is formed in the transparent insulation layer 106 at the lower transparent electrode 103, and the upper concave groove 113 is formed in the transparent insulation layer 106 at the upper transparent electrode 108. As illustrated in FIG. 1, the lower concave groove 112 may be narrower than the upper concave groove 113. The lower concave groove 112 of the transparent insulation layer 106 is correspondingly formed over the protrusion 105a that extends toward the inside of the lower portion of the reflection wall 105. On the other hand, the upper concave groove 113 of the transparent insulation layer 106 may be formed by, for example, increasing the thickness of an edge portion of the transparent insulation layer 106 to be larger than the thickness of a center portion of the transparent insulation layer 106. Further, a surface of the transparent insulation layer 106 may be treated so that the charged particle 110 does not stick to the surface of the transparent insulation layer 106. For example, the surface of the transparent insulation layer 106 may be hydrophobic or hydrophilic treated depending on whether the charged particle 110 has (+) or (−) polarity, respectively. As another example, the transparent insulation layer 106 may be embedded with net charge so that the charged particle 110 does not stick to the surface of the transparent insulation layer 106.

As described above, according to the current exemplary embodiment, one electrically charged particle 110 is disposed in the closed inner space 111. The charged particle 110 may be obtained by charging a particle formed of an opaque material with a (−) or (+) polarity. For example, a metal sphere formed of aluminum may be charged to obtain the charged particle 110. The charged particle 110 may land at the lower concave groove 112 or the upper concave groove 113 according to the direction of an electrical field applied to the closed inner space 111. A diameter of the charged particle 110 is smaller than a diameter of the closed inner space 111 but is larger than a diameter of the light path in the center portion of the lower concave groove 112. For example, the diameter of the charged particle 110 may be about 1 µm to about 10 µm.

Meanwhile, the charged particle 110 needs to always maintain the electrically charged state in the closed inner space 111 of the optical shutter 100. Accordingly, in an exemplary embodiment, other particles or gas having charges should not be present in the closed inner space 111 as much as possible. In detail, since oxygen is likely to react to particles charged with a (+) polarity, oxygen may be removed from the closed inner space 111. To this end, the closed inner space 111 may be kept as a vacuum. Alternatively, noble gas or inert gas such as Ar may be filled in the closed inner space 111.

Figure 2:
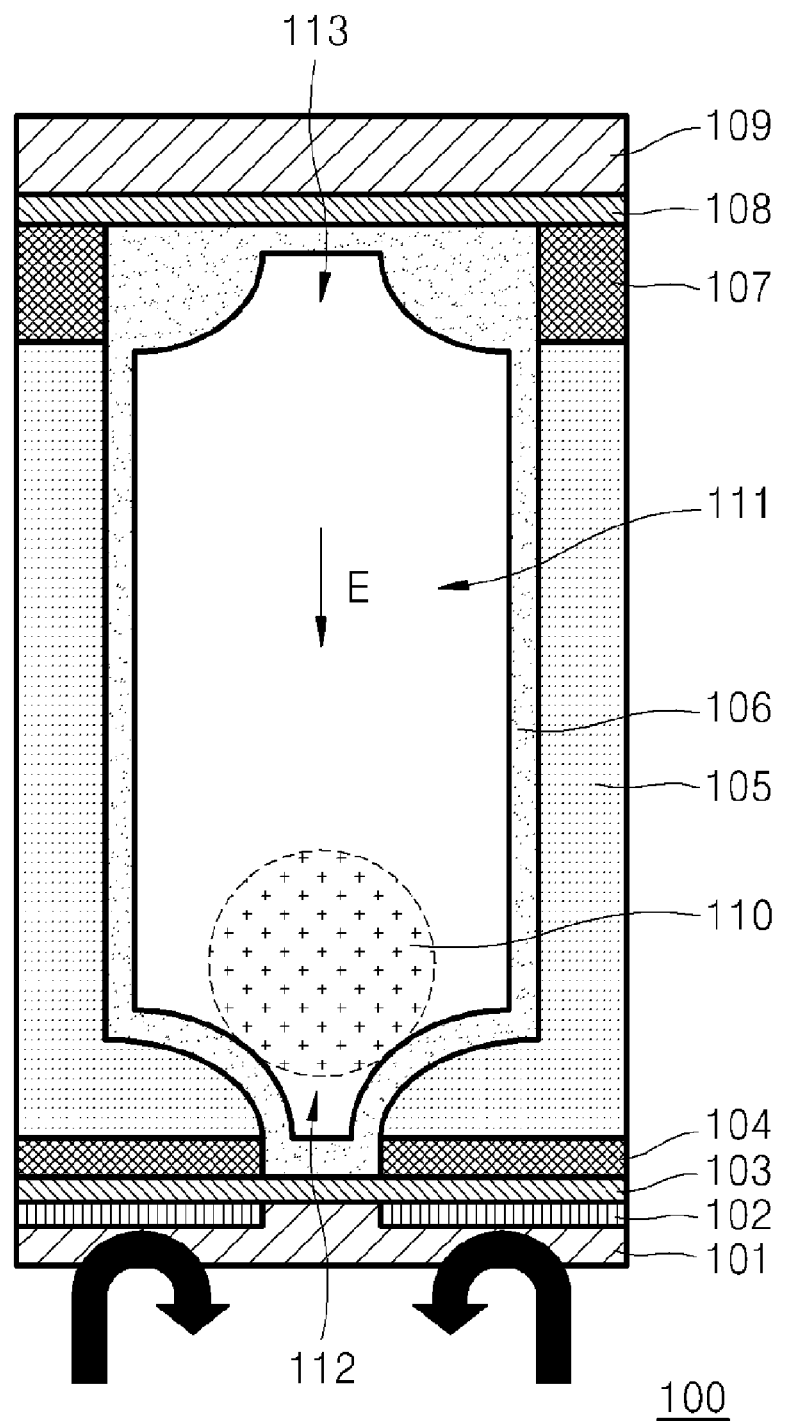
FIGS. 2 and 3 are cross-sectional views illustrating the operation of the optical shutter illustrated in FIG. 1.
Figure 3:
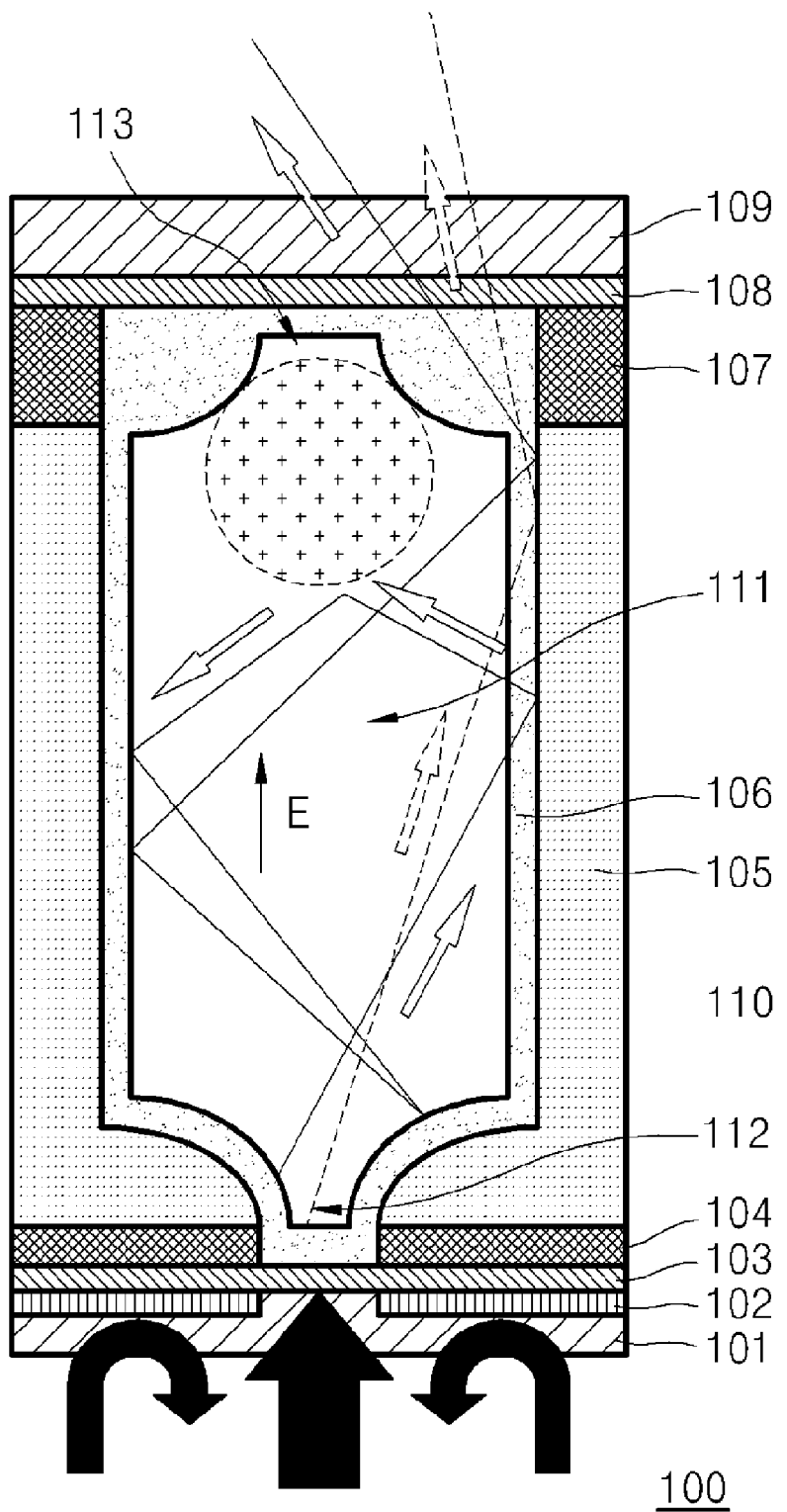

FIGS. 2 and 3 are schematic views illustrating an operation of the optical shutter 100 having the above-described structure. It is assumed that the charged particle 110 is charged with a (+) polarity, and a light source (not shown) is disposed below the optical shutter 100. Referring to FIG. 2, for example, the lower transparent electrode 103 is connected to a ground, and a (+) voltage is applied to the upper transparent electrode 108. Then an electrical field E which flows from top to bottom is generated in the closed inner space 111 as shown in FIG. 2. Accordingly, the charged particle 110 which is charged with a (+) polarity lands at the lower concave groove 112 along a direction of the electrical field E. As described above, the diameter of the charged particle 110 is larger than the diameter of the light path in the center portion of the lower concave groove 112, that is, the opening of the reflection plate 102 and the lower resistance layer 104. Thus, light emitted from the light source is completely reflected by the reflection plate 102 and is not incident to the closed inner space 111 of the optical shutter 100. Consequently, the optical shutter 100 in FIG. 2 is optically turned off.

On the other hand, referring to FIG. 3, a (+) voltage is applied to the lower transparent electrode 103, and the upper transparent electrode 108 is connected to a ground. Then an electrical field E which flows from bottom to top is generated in the closed inner space 111 as shown in FIG. 3. Accordingly, the charged particle 110 lands at the upper concave groove 113 along the direction of the electrical field E. Thus, as the light path in the lower portion of the optical shutter 100 is opened, some of light emitted from the light source is incident to the closed inner space 111. The light incident to the closed inner space 111 is reflected off the reflection wall 105 and proceeds to the upper portion of the optical shutter 100. As described above, the upper concave groove 113 is larger than the lower concave groove 112, and the diameter of the closed inner space 111 is larger than the diameter of the charged particle 110. Accordingly, light is finally emitted to the outside through the upper concave groove 113 of the transparent insulation layer 106, the upper transparent electrode 108, and the upper transparent substrate 109. Consequently, the optical shutter 100 in FIG. 3 is optically turned on.

The optical shutter 100 according to the current exemplary embodiment may block or transmit light by changing the location of the charged particle 110 according to the direction the electrical field E. A new type of display apparatus may be realized using the optical shutter 100 as a pixel of a display apparatus. The charged particle 110 is very sensitive to changes of the electrical field E, and thus a display apparatus with high operational speed may be provided.

Figure 4:
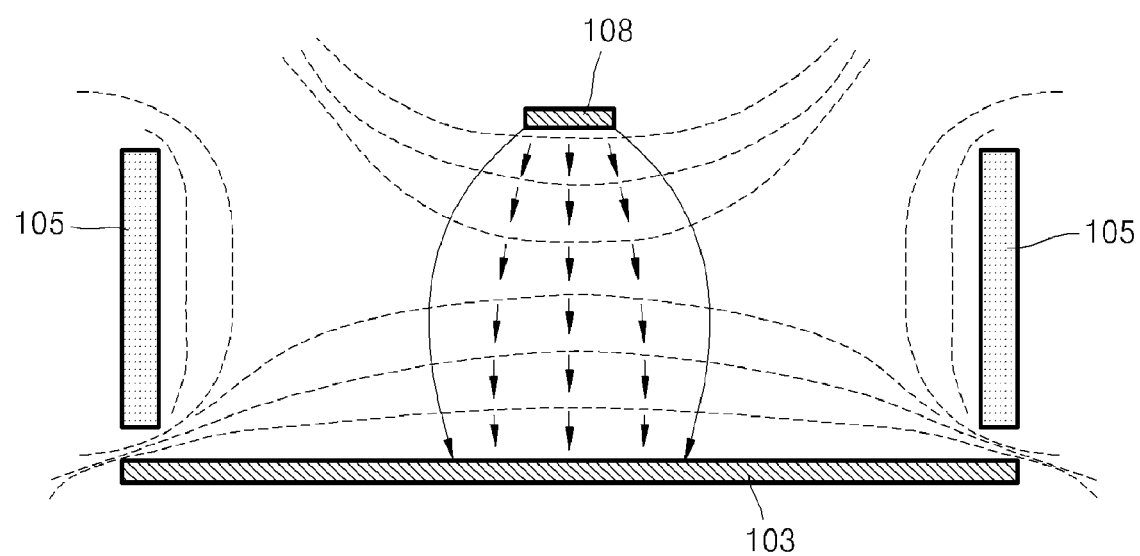
FIG. 4 illustrates an electrical field generated in the optical shutter illustrated in FIG. 1.

While the lower transparent electrode 103 and the upper transparent electrode 108 are illustrated as having an equal length in FIGS. 1 through 3, the lengths of the lower and upper transparent electrodes 103 and 108 may differ when the optical shutter 100 is used as a pixel of a display apparatus. For example, in a display apparatus in which a plurality of the optical shutters 100 are arranged, a plurality of the lower transparent electrodes 103 and a plurality of the upper transparent electrodes 108 may be arranged in a mesh structure in which they cross one another perpendicularly. In this case, for example, when seen along a cross-section perpendicular to the lower transparent electrode 103, the lower transparent electrode 103 may be longer than the upper transparent electrode 108, as shown in FIG. 4. Thus, electrical fields generated between the upper transparent electrode 108 and the lower transparent electrode 103 are not parallel but broad toward the bottom. Thus, it may be difficult to accurately induce the movement of the charged particle 110 in the closed inner space 111 of the optical shutter 100.

Accordingly, in order to generate an electrical field between the upper transparent electrode 108 and the lower transparent electrode 103 as parallel as possible, the optical shutter 100 may be designed such that an electrical field is also generated on the reflection wall 105 as shown in FIG. 4. To this end, for example, the reflection wall 105 may be formed of a metal having conductivity. Also, the reflection wall 105 may be electrically connected to the upper transparent electrode 108 and the lower transparent electrode 103. However, if the reflection wall 105 is directly connected to the upper transparent electrode 108 and the lower transparent electrode 103, an electrical short circuit may be generated, and thus the lower resistance layer 104 and the upper resistance layer 107 are disposed between the reflection wall 105 and the lower transparent electrode 103 and between the reflection wall 105 and the upper transparent electrode 108, respectively. The lower resistance layer 104 and the upper resistance layer 107 allow a potential difference between the reflection wall 105 and the lower transparent electrode 103 and between the reflection wall 105 and the upper transparent electrode 108, respectively.

However, according to exemplary embodiments, when a sufficient parallel electrical field is obtained even when the reflection wall 105 does not generate an electrical field, or when a parallel electrical field is not needed, the reflection wall 105 may be formed of a dielectric mirror. In this case, the lower resistance layer 104 and the upper resistance layer 107 are not needed, and the reflection wall 105 may be directly connected between the upper transparent electrode 108 and the lower transparent electrode 103. Also, in this case, the transparent insulation layer 106 does not need to be disposed on the reflection wall 105. The transparent insulation layer 106 may be disposed only on surfaces of the upper transparent electrode 108 and the lower transparent electrode 103.

Figure 5:
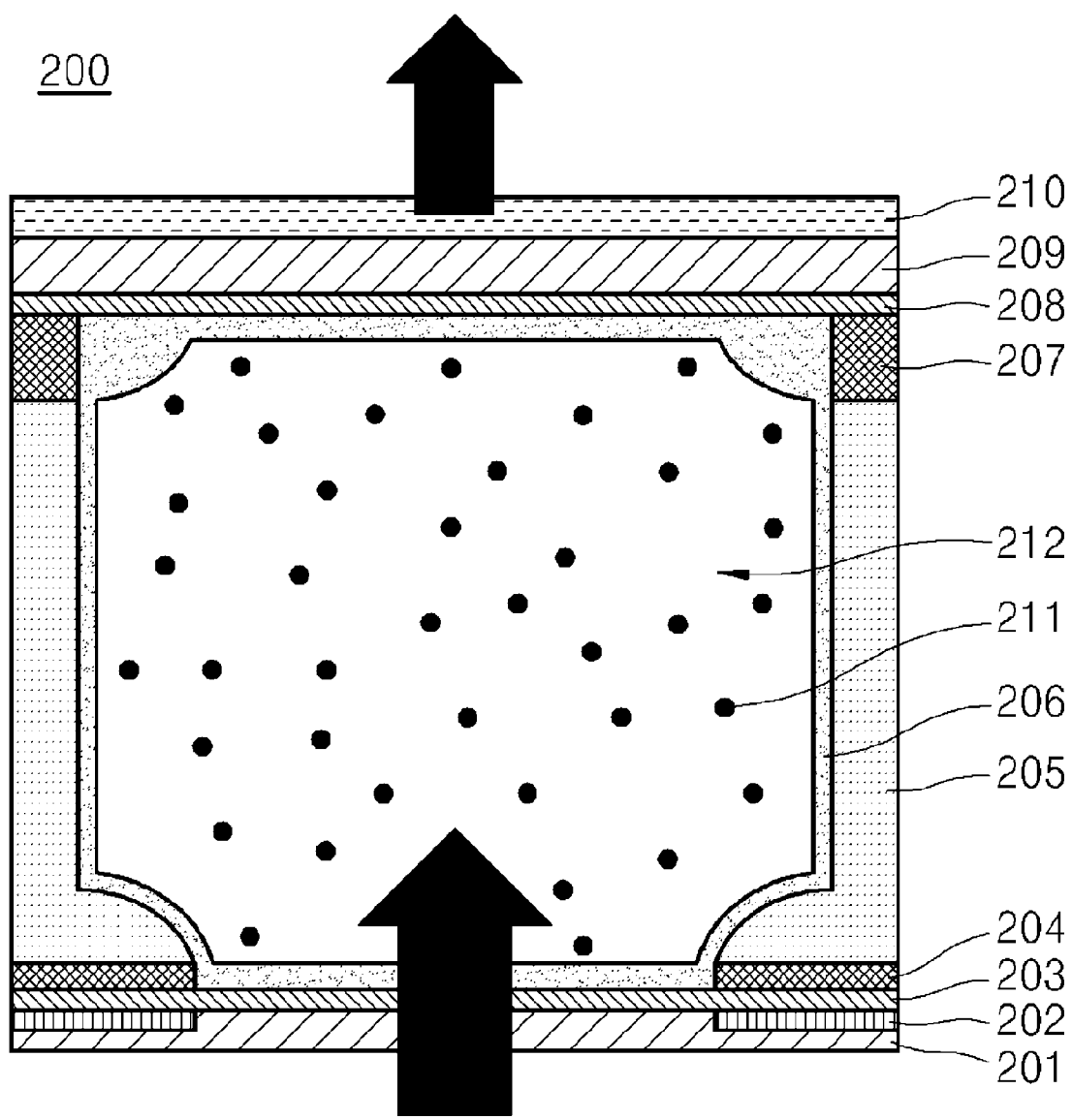
FIG. 5 is a cross-sectional view illustrating the structure of an optical shutter according to another exemplary embodiment.

FIG. 5 is a cross-sectional view illustrating the structure of an optical shutter 200 according to another exemplary embodiment. Compared with the optical shutter 100 of FIG. 1, the optical shutter 200 illustrated in FIG. 5 includes a plurality of charged particles 211 charged with an identical polarity, instead of the one charged particle 110. Also, the optical shutter 200 does not include the lower and upper concave grooves 112 and 113 as in FIG. 1. In FIG. 5, edge portions of a transparent insulation layer 206 are illustrated to protrude toward an inner space 212, but the inner space 212 may also be formed in a form that is near to that of a rectangle. The remaining structure of the optical shutter 200 is almost the same as the structure of the optical shutter 100 illustrated in FIG. 1.

In detail, referring to FIG. 5, a lower transparent electrode 203 is formed over an entire upper surface of a lower transparent substrate 201, and a reflection plate 202 is disposed between the lower transparent substrate 201 and the lower transparent electrode 203 at edge portions. A lower resistance layer 204 is formed at edge portions on the lower transparent electrode 203. Alternatively, the reflection plate 202 may be disposed between the lower transparent electrode 203 and the lower resistance layer 204. Also, a reflection wall 205 is formed to define the inner space 212 and to seal the inner space 212. An upper resistance layer 207 is formed on the reflection wall 205, and an upper transparent electrode 208 and an upper transparent substrate 209 are sequentially formed on the upper resistance layer 207 in the order stated. The transparent insulation layer 206 is formed on the entire inner walls of the optical shutter 100.

Hereinafter, an operation of the optical shutter 200 will be described with reference to FIGS. 5 through 7. It is assumed that the charged particles 211 are charged all with a (+) polarity, and a light source (not shown) is disposed below the optical shutter 200.

As described above, the charged particles 211 filled in the inner space 212 of the optical shutter 200 illustrated in FIG. 5 are charged with the same polarity. Accordingly, when an electrical field is not applied to the inner space 212, the charged particles 212 repel one another due to repulsive forces and thus are uniformly dispersed in the inner space 212. In this case, a diameter of each of the charged particles 211 is much smaller than the size of the inner space 212, and thus light emitted from the light source may transmit, i.e., pass, through the optical shutter 200 almost without any loss. For example, the diameter of the inner space 212 may be about 10 μm to about 500 μm, and the diameter of one charged particle 211 may be about 1 nm to about 1 μm.

Figure 6:
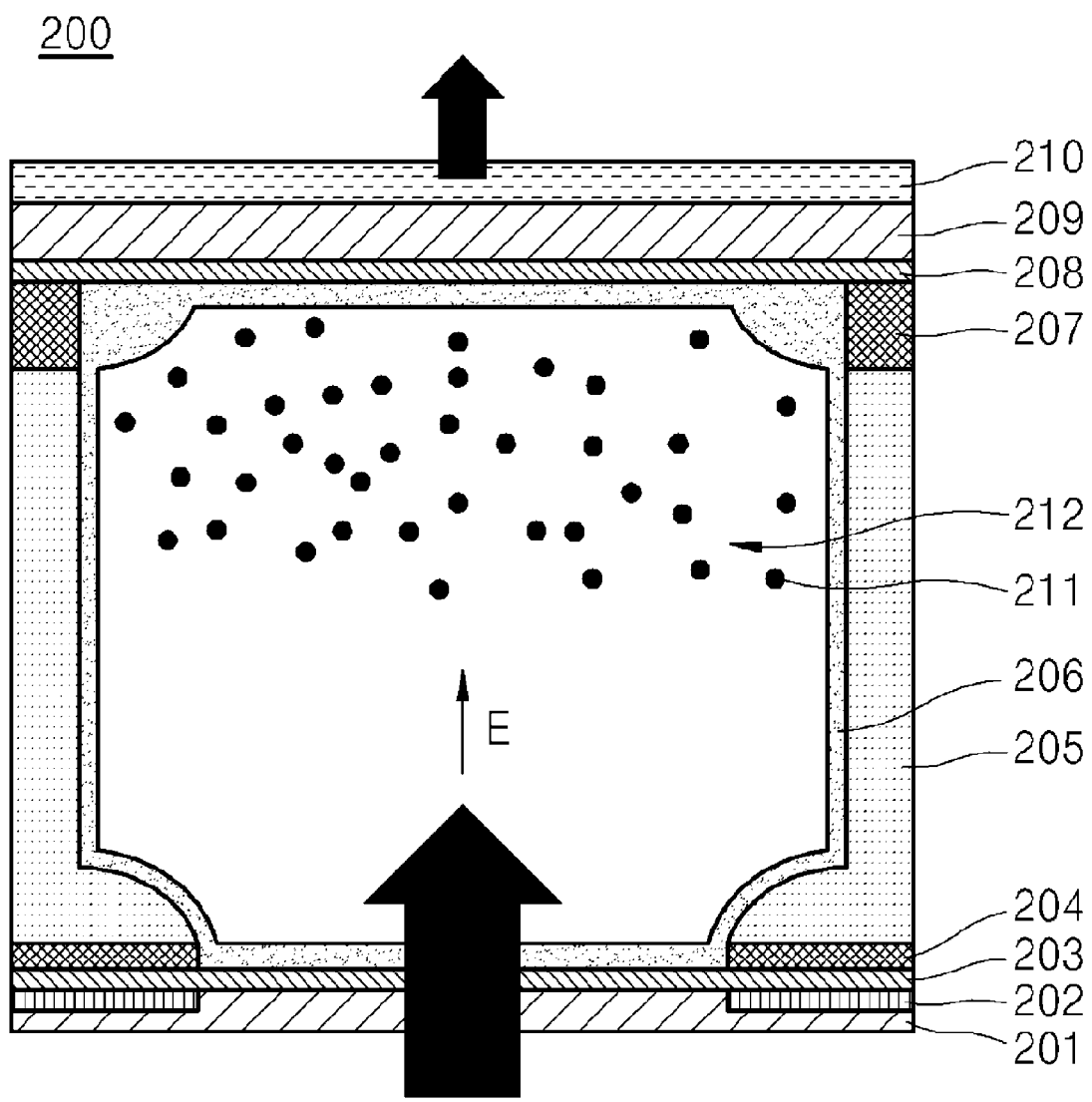
FIGS. 6 and 7 are cross-sectional views illustrating the operation of the optical shutter illustrated in FIG. 5.
Figure 7:
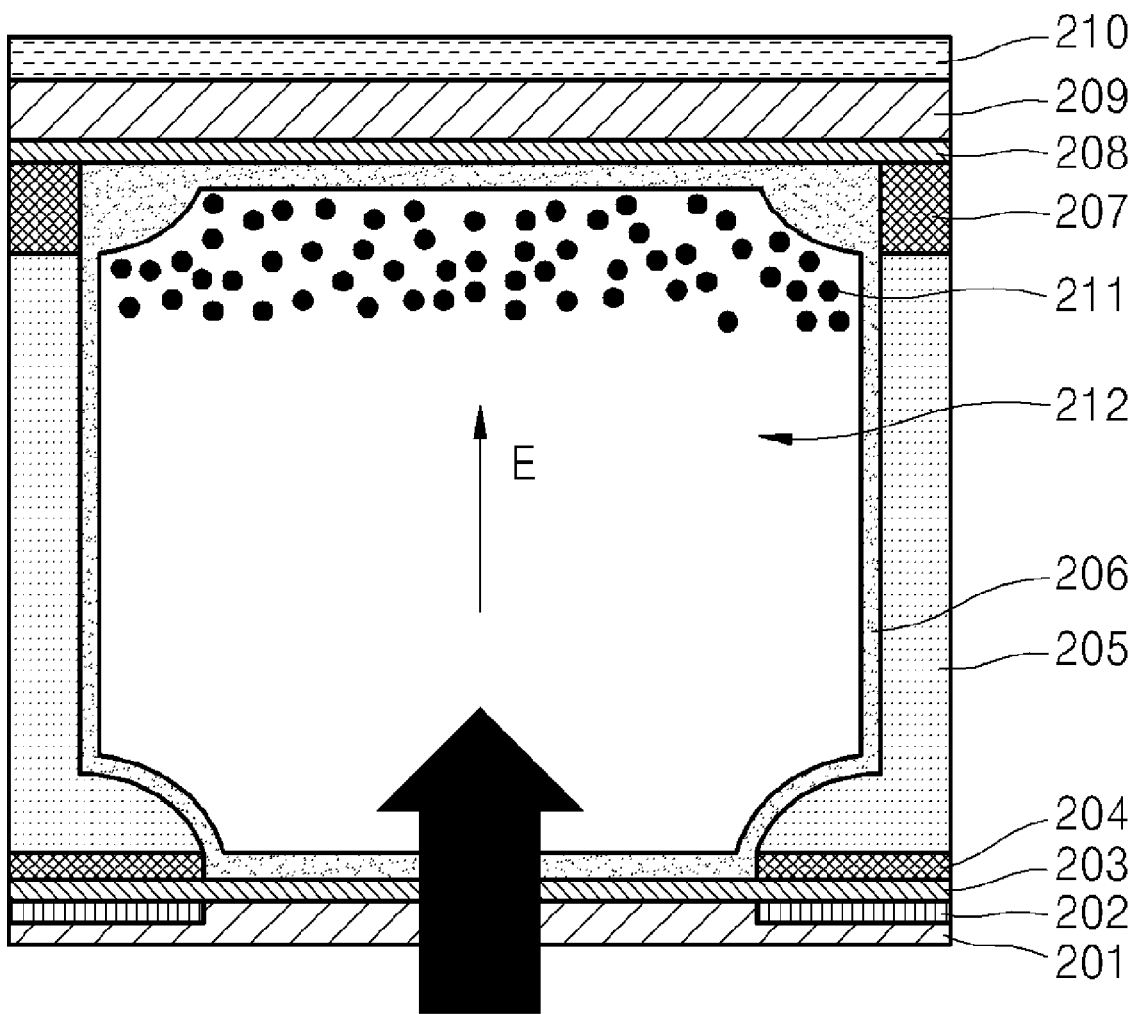

FIGS. 6 and 7 are cross-sectional views illustrating the operation of the optical shutter 200 illustrated in FIG. 5. As illustrated in FIG. 6, when a weak electrical field is applied to the inner space 212 from bottom to top, the charged particles 211 move to an upper portion of the inner space 212 little by little. Accordingly, the density of the charged particles 211 in the upper portion of the inner space 212 is increased, and thus, the amount of light that transmits through the optical shutter 200 is reduced. Also, as illustrated in FIG. 7, when the intensity of the electrical field in the inner space 212 is increased, all of the charged particles 211 gather on the upper portion of the inner space 212, thus preventing the entire light from transmitting through the optical shutter 200.

The optical shutter 100 illustrated in FIG. 1 may only control the transmission or blocking of light, and thus only black or white color may be displayed. However, as described above, the optical shutter 200 illustrated in FIG. 5 may control the amount of light according to the intensity of the electrical field applied to the inner space 212. Thus, a grey level may be controlled, and furthermore, various other colors may also be expressed. Referring to FIG. 5, in the optical shutter 200, a color filter 210 is further disposed on the upper transparent substrate 209. Alternatively, the color filter 210 may be disposed between the upper transparent electrode 208 and the upper transparent substrate 209. A color display apparatus may be realized using the optical shutter 200 as a pixel of a display apparatus.

Also, the optical shutter 200 illustrated in FIG. 5 uses the light source such as a backlight unit but the optical shutter 200 may also use light generated from an external light source such as the sun or an indoor lamp. For example, referring to FIG. 5, since the charged particles 212 are uniformly dispersed inside the inner space 212, light from the outside may transmit through the color filter 210, the upper transparent substrate 209, and the upper transparent electrode 208 and be incident to the inner space 212 again, and be reflected on the reflection wall 205 and emitted to the outside almost without any loss. Also, referring to FIG. 6, as the density of the charged particles 211 is increased in the upper portion of the inner space 212, light from the outside is incident to the inner space 212 and only a portion of the light is emitted to the outside. Also, referring to FIG. 7, all of the charged particles 211 are gathered on the upper portion of the inner space 212, and thus light from the outside is blocked mostly. Accordingly, in an environment where the intensity of external light is strong, a reflective display apparatus which operates using only external light instead of a light source may be realized using the optical shutter 200.

Figure 8:
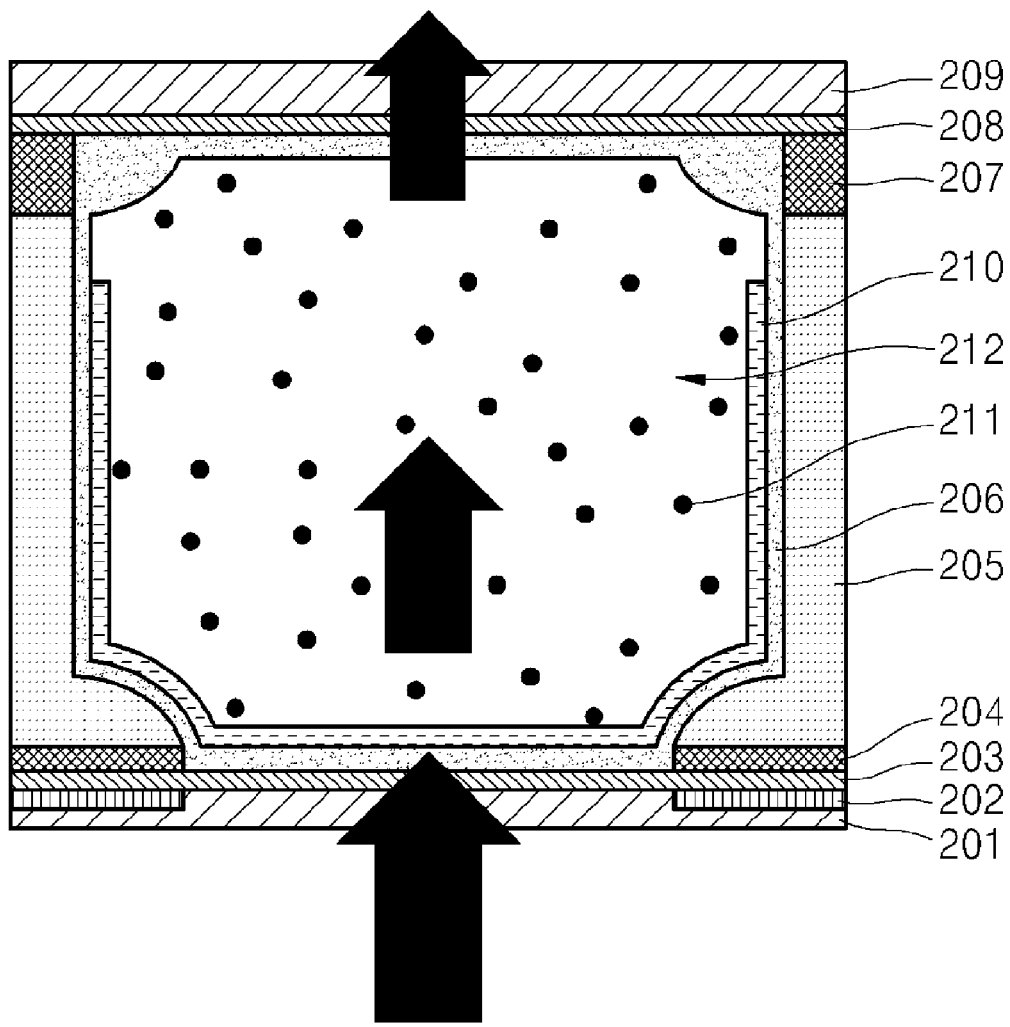
FIG. 8 is a cross-sectional view illustrating the structure of an optical shutter according to another exemplary embodiment.

FIG. 8 is a cross-sectional view illustrating the structure of an optical shutter 300 according to another exemplary embodiment. Compared to the optical shutter 200 of FIG. 5, the optical shutter 300 illustrated in FIG. 8 is different in that a color filter 210 is disposed on the inner walls of the transparent insulation layer 206. As illustrated in FIG. 8, the color filter 210 is formed on a bottom surface and lateral surfaces of the transparent insulation layer 206. The operation of the optical shutter 200 described with reference to FIGS. 5 through 7 may be applied to that of the optical shutter 300 of FIG. 8, and also, not only a separate light source but also an external light source may be used. The remaining structure of the optical shutter 300 illustrated in FIG. 8 is the same as the structure of the optical shutter 200 illustrated in FIG. 5.

Figure 9:
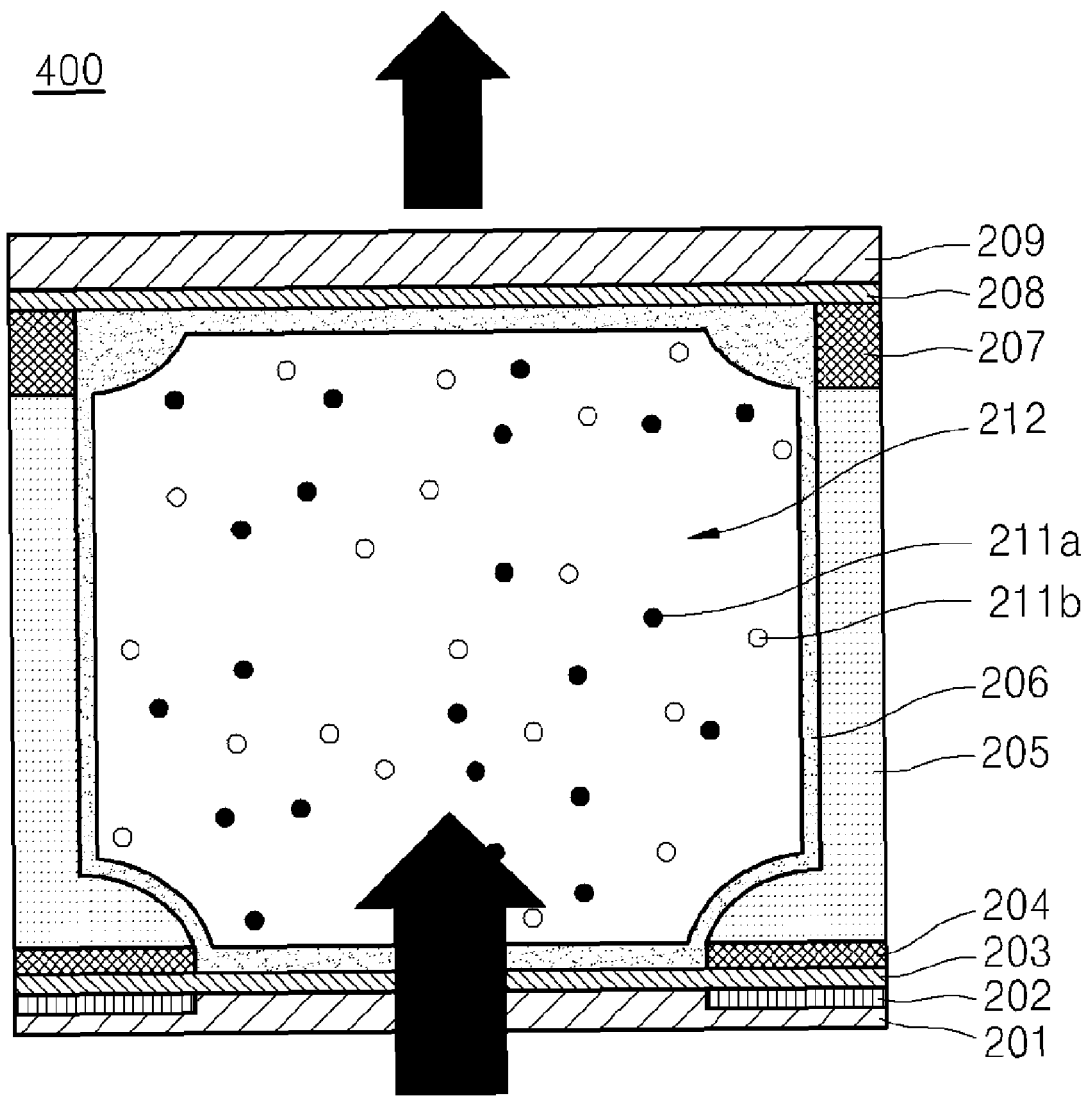
FIG. 9 is a cross-sectional view illustrating the structure of an optical shutter according to another exemplary embodiment.

FIG. 9 is a cross-sectional view illustrating the structure of an optical shutter 400 according to another exemplary embodiment. Compared to the optical shutter 200 of FIG. 5, the optical shutter 400 illustrated in FIG. 9 is different in that two types of charged particles 211a and 211b having two different color absorption characteristics are used. The two types of charged particles 211a and 211b are charged with the same polarity, and differ only in their color absorption characteristics. For example, fine particles having a core-shell structure including a core formed of a dielectric body and a shell formed of a metal, are known to have different color absorption characteristics according to the ratio of the radii of the core and the shell. By charging a metal shell of the particles, charged particles having color absorption characteristics may be obtained. According to the current exemplary embodiment, color may be realized by using the two types of charged particles 211a and 211b whose cores and shells differ in the radius ratio. For example, a green color may be realized by mixing the charged particle 211a absorbing light in a red luminescence band and the charged particle 211b absorbing light in a blue luminescence band. Accordingly, no color filter is needed in the optical shutter 400 illustrated in FIG. 9. The remaining structure of the optical shutter 400 of FIG. 9 is the same as that of the optical shutter 200 of FIG. 5.

Figure 10:
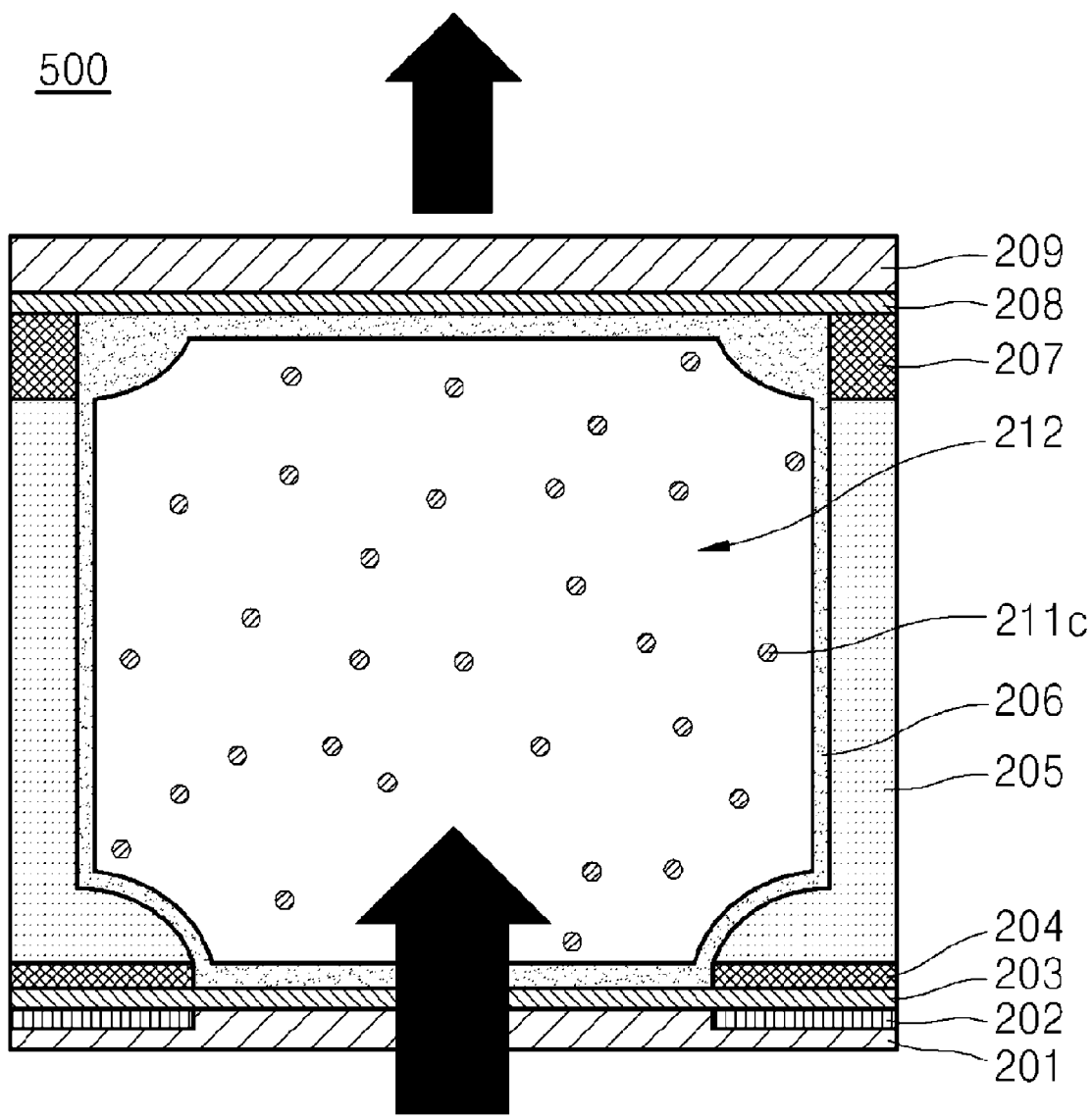
FIG. 10 is a cross-sectional view illustrating the structure of an optical shutter according to another exemplary embodiment.

FIG. 10 is a cross-sectional view illustrating the structure of an optical shutter 500 according to another exemplary embodiment. Compared to the optical shutter 200 of FIG. 5, the optical shutter 500 illustrated in FIG. 10 is different in that a plurality of charged particles 211c having reflection characteristics in regard to a predetermined color are used. The charged particles 211c may be obtained by charging particles having wavelength-selective reflection characteristics. Accordingly, the optical shutter 500 illustrated in FIG. 10 does not need a color filter. The remaining structure of the optical shutter 500 of FIG. 10 is the same as that of the optical shutter 200 of FIG. 5.

Figure 11:
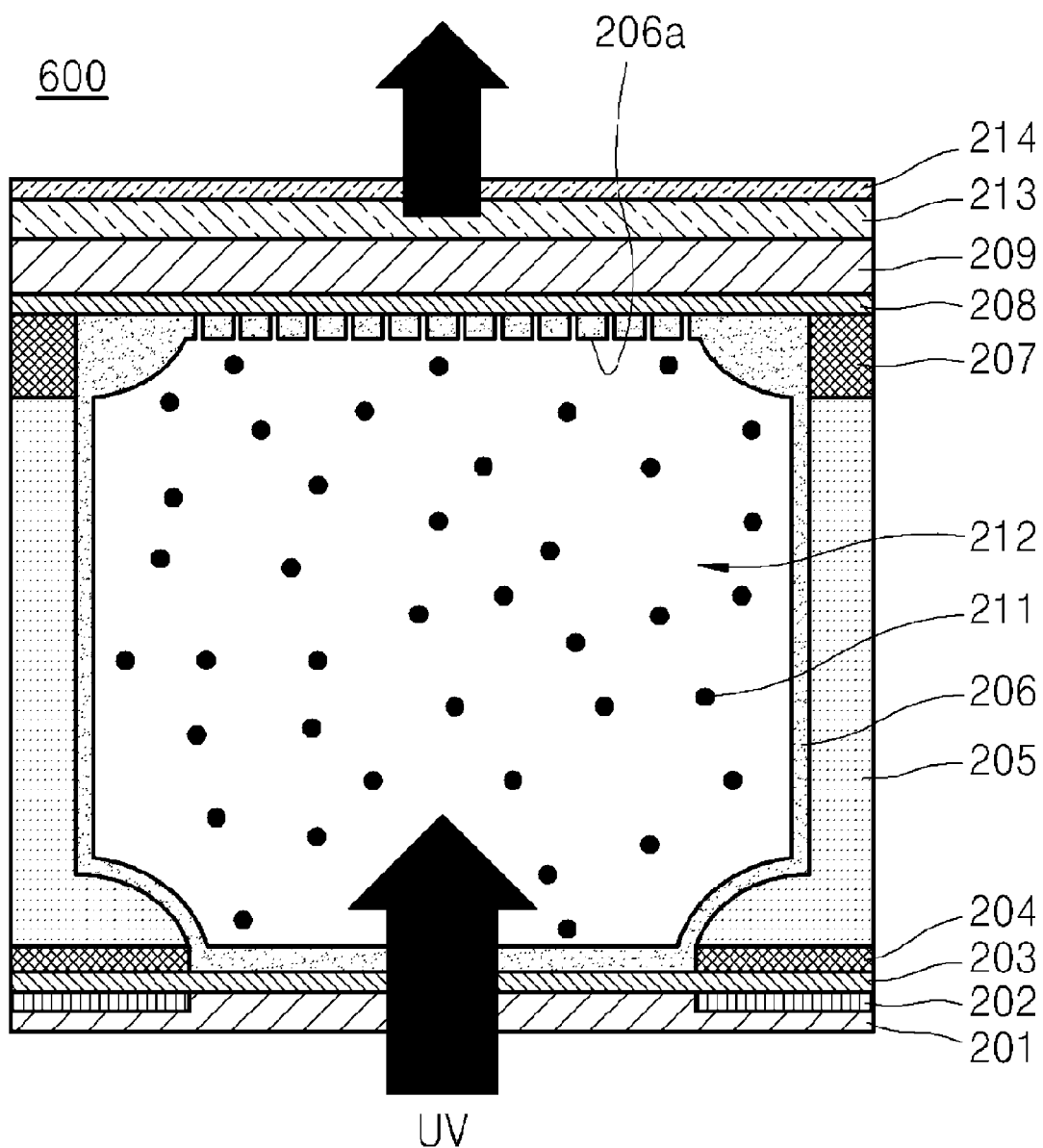
FIG. 11 is a cross-sectional view illustrating the structure of an optical shutter according to another exemplary embodiment.

FIG. 11 is a cross-sectional view illustrating the structure of an optical shutter 600 according to another exemplary embodiment. Compared to the optical shutter 200 of FIG. 5, the optical shutter 600 illustrated in FIG. 11 is different in that a quantum-dot color filter 213 which is excited by UV light and emits visible light having a predetermined wavelength is used instead of a general color filter. For example, the quantum-dot color filter 213 may be formed of a gain material which is used in lasers, etc. As illustrated in FIG. 11, the quantum-dot color filter 213 is disposed on the upper transparent substrate 209, and a UV absorption layer 214 may be further disposed on the quantum-dot color filter 213 for removing residual UV light. In the current exemplary embodiment, a UV light source (not shown) which emits UV light may be used as a separate light source of the optical shutter 600.

In addition, charged particles 211 may be formed by inserting particles that are in an uncharged state into the inner space 212 and charging the particles after assembling the optical shutter 600. To this end, a plurality of fine through-holes are formed in an upper portion 206a of the transparent insulation layer 206 formed on a lower surface of the upper transparent electrode 208 so that electrons may pass through the fine through holes. The fine through-holes are smaller than the charged particles 211 in diameter, and thus the charged particles 211 may not contact the upper transparent electrode 208 and only electrons from the charged particles 211 may be discharged from the upper transparent electrode 208 after passing through the fine through-holes.

Meanwhile, the fine through-holes are illustrated as being formed in the upper portion 206a of the transparent insulation layer 206 in FIG. 11, but the fine through-holes may also be formed in a lower portion of the transparent insulation layer 206. Also, some of the materials for the transparent insulation layer 206 may naturally have fine pores through which electrons may pass. When using the material, there is no need to form the fine through-holes artificially.

There are two exemplary methods of charging uncharged particles in the inner space 212. One of the exemplary methods is a photoemission method using the photoelectric effect. For example, when UV light having a wavelength of about 250 nm to about 300 nm is irradiated to fine aluminum particles, one electron may be emitted from each of aluminum atoms in the aluminum particles. Accordingly, according to the current exemplary embodiment, the aluminum particles may be used as the charged particles 211, and a UV light source of a wavelength of about 250 nm to about 300 nm may be used as a separate light source of the optical shutter 600 for photoemission. Once one electron is emitted from an aluminum atom, another electron is emitted only when light of a shorter wavelength is irradiated, and thus the charged particles 211 are not further charged by UV light anymore. While charging the particles, when a (+) voltage is applied to the upper transparent electrode 208, electrons emitted from the charged particles 211 pass through the fine through-holes formed in the upper portion 206a of the transparent insulation layer 206 and discharged from the upper transparent electrode 208.

The other exemplary method is electrically charging particles by applying a high voltage between the upper transparent voltage 208 and the lower transparent electrode 203. For example, when a voltage of about 100 V to about 200 V is applied to the upper transparent electrode 208, electrons are emitted from the particles and may be discharged from the upper transparent electrode 208. In general, the optical shutter 600 may be operated using a voltage of 10 V or lower, and thus once the charged particles 211 are formed from chargeable particles, there is hardly the need to apply such a high voltage again. However, considering that the number of charged particles 211 may decrease naturally, a high voltage may be applied to the upper transparent electrode 208 at predetermined regular periods or when the optical shutter 600 is turned on.

The above-described charging methods of charging uncharged particles may be applied to all of the exemplary embodiments.

Meanwhile, the optical shutters 100, 200, 300, 400, 500, and 600 according to the above-described exemplary embodiments do not need a high temperature manufacturing process. Thus, a flexible material which is sensitive to high temperatures may be used as a substrate. For example, light-transmissive resin materials such as polyethylene naphthalate (PEN), polycarbonate (PC), and polyethylene terephthalate (PET), etc. may be used to form the lower transparent substrates 101 and 201 and the upper transparent substrates 109 and 209. Also, the lower transparent electrodes 103 and 203 and the upper transparent electrodes 108 and 208 may be formed of a transparent conductive polymer instead of indium tin oxide (ITO). By forming the optical shutters 100, 200, 300, 400, 500, and 600 using flexible materials, a flexible display apparatus may be realized. Also, a flexible noctilucent material may be used to form a light source such as a backlight unit.

Also, a dielectric coating may be further formed on a surface of the above-described charged particles 110 or 211 so as to maintain a charged state. For example, for the charged particles 110 or 211 formed of aluminum particles, the surfaces of the aluminum particles may be slightly oxidized to form thereon a dielectric coating formed of $Al_2O_3$. In this case, the transparent insulation layer 106 or 206 may not be used.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. An optical shutter comprising:
    a first transparent electrode and a second transparent electrode disposed to face each other;
    a reflection wall that surrounds an inner space disposed between the first and the second transparent electrodes so that the inner space is closed, and reflects light;
    a transparent insulation layer formed over an inner surface of the first transparent electrode, an inner surface of the second transparent electrode, and inner surfaces of the reflection wall;
    at least one charged particle disposed in the closed inner space, wherein the at least one charged particle is a one charged particle disposed in the closed inner space;
    a first concave groove is formed in the transparent insulation layer on the first transparent electrode so that the one charged particle is operable to land at the first concave groove; and
    a second concave groove is formed on the transparent insulation layer on the second transparent electrode so that the one charged particle is operable to land at the second concave groove.

2. The optical shutter of claim 1, wherein the first concave groove is narrower than the second concave groove.

3. The optical shutter of claim 1, further comprising a reflection plate that reflects light, and is disposed below or above the first transparent electrode,
    wherein an opening is formed in a center portion of the reflection plate so that light passes through the opening formed in the center portion of the reflection plate.

4. The optical shutter of claim 3, wherein a diameter of the one charged particle is smaller than a diameter of the inner space and larger than a diameter of the opening.

5. The optical shutter of claim 1, wherein the reflection wall is formed of a dielectric mirror.

6. An optical shutter comprising:
a first transparent electrode and a second transparent electrode disposed to face each other;
a reflection wall that surrounds an inner space disposed between the first and the second transparent electrodes so that the inner space is closed, and reflects light; and
at least one charged particle disposed in the closed inner space,
wherein the reflection wall has electrical conductivity, and the optical shutter further comprises a first resistance layer disposed between the reflection wall and the first transparent electrode and a second resistance layer disposed between the reflection wall and the second transparent electrode.

7. An optical shutter comprising:
a first transparent electrode and a second transparent electrode disposed to face each other;
a reflection wall that surrounds an inner space disposed between the first and the second transparent electrodes so that the inner space is closed, and reflects light; and
at least one charged particle disposed in the closed inner space,
wherein the at least one charged particle is a plurality of charged particles which are charged with an equal polarity and are dispersed in the closed inner space,
wherein the optical shutter further comprises a transparent insulation layer formed over an inner surface of the first transparent electrode, an inner surface of the second transparent electrode, and inner surfaces of the reflection wall, and
wherein a plurality of fine through-holes are formed in a portion of the transparent insulation layer formed on the first or the second transparent electrode.

8. The optical shutter of claim 7, wherein a dielectric coating is formed on a surface of the plurality of charged particles.

9. The optical shutter of claim 7, further comprising a quantum-dot color filter disposed on the second transparent electrode and a ultraviolet absorption layer disposed on the quantum-dot color filter.

10. The optical shutter of claim 7, wherein the reflection wall has electrical conductivity, and the optical shutter further comprises a first resistance layer disposed between the reflection wall and the first transparent electrode and a second resistance layer disposed between the reflection wall and the second transparent electrode.

11. The optical shutter of claim 7, further comprising a color filter disposed on an upper surface of the second transparent electrode.

12. The optical shutter of claim 7, further comprising a color filter disposed over a bottom surface of the transparent insulation layer and lateral surfaces of the transparent insulation layer.

13. The optical shutter of claim 7, wherein the plurality of charged particles comprise at least two types of particles having different color absorption characteristics.

14. The optical shutter of claim 7, wherein the plurality of charged particles comprise particles having wavelength-selective reflection characteristics.

15. A display apparatus comprising an optical shutter transmitting or blocking light emitted from an outside, wherein the optical shutter comprises:
a first transparent electrode and a second transparent electrode disposed to face each other;
a reflection wall that surrounds an inner space between the first and the second transparent electrodes so that the inner space is closed, and reflects light;
a transparent insulation layer formed over an inner surface of the first transparent electrode, an inner surface of the second transparent electrode, and inner surfaces of the reflection wall;
charged particles disposed in the closed inner space; wherein the at least one charged particle is a one charged particle disposed in the closed inner space;
a first concave groove is formed in the transparent insulation layer on the first transparent electrode so that the one charged particle is operable to land at the first concave groove; and
a second concave groove is formed on the transparent insulation layer on the second transparent electrode so that the one charged particle is operable to land at the second concave groove.

16. An optical shutter comprising:
a first transparent electrode and a second transparent electrode disposed to face each other;
a reflection wall that surrounds an inner space disposed between the first and the second transparent electrodes so that the inner space is closed, and reflects light, wherein the reflection wall has electrical conductivity, and the optical shutter further comprises a first resistance layer disposed between the reflection wall and the first transparent electrode and a second resistance layer disposed between the reflection wall and the second transparent electrode; and
at least one charged particle disposed in the closed inner space.

17. A display apparatus comprising an optical shutter transmitting or blocking light emitted from an outside, wherein the optical shutter comprises:
a first transparent electrode and a second transparent electrode disposed to face each other;
a reflection wall that surrounds an inner space between the first and the second transparent electrodes so that the inner space is closed, and reflects light; and
charged particles disposed in the closed inner space,
wherein the reflection wall has electrical conductivity, and the optical shutter further comprises a first resistance layer disposed between the reflection wall and the first transparent electrode and a second resistance layer disposed between the reflection wall and the second transparent electrode.

18. A display apparatus comprising an optical shutter transmitting or blocking light emitted from an outside, wherein the optical shutter comprises:
a first transparent electrode and a second transparent electrode disposed to face each other;
a reflection wall that surrounds an inner space between the first and the second transparent electrodes so that the inner space is closed, and reflects light; and
charged particles disposed in the closed inner space,
wherein the at least one charged particle is a plurality of charged particles which are charged with an equal polarity and are dispersed in the closed inner space,
wherein the optical shutter further comprises a transparent insulation layer formed over an inner surface of the first transparent electrode, an inner surface of the second transparent electrode, and inner surfaces of the reflection wall,
wherein a plurality of fine through-holes are formed in a portion of the transparent insulation layer formed on the first or the second transparent electrode.

* * * * *